United States Patent
Laing

[15] 3,695,399
[45] Oct. 3, 1972

[54] OVERSPEED SAFETY BRAKE FOR ELEVATORS

[72] Inventor: Marvin R. Laing, 6009 Birchcrest Dr., Edina, Minn. 55436

[22] Filed: Oct. 26, 1970

[21] Appl. No.: 83,703

[52] U.S. Cl. .................. 188/187, 187/89, 188/180, 188/189
[51] Int. Cl. ............................................. F16d 65/24
[58] Field of Search...188/180, 181 R, 181 A, 181 T, 188/187, 189; 187/38, 73, 77, 89; 254/159

[56] References Cited

UNITED STATES PATENTS

| | | | |
|---|---|---|---|
| 3,526,302 | 9/1970 | Grant et al. | 188/180 |
| 3,119,464 | 1/1964 | Rountree | 187/89 |

*Primary Examiner*—Evon C. Blunk
*Assistant Examiner*—Johnny D. Cherry
*Attorney*—Williamson, Palmatier & Bains, H. Dale Palmatier, Herman H. Bains and Malcolm L. Moore

[57] ABSTRACT

A safety brake for use on a rotary component of an elevator comprising a plurality of interleaved driving and driven discs which frictionally coact to brake the elevator to a stop at a predetermined, maximum speed of said rotary component. The aforesaid discs are clamped between an annular braking plate connected to said rotaty component and a braking clamp, the driving discs being coupled to said braking plate for rotation therewith and the driven discs being coupled to the braking clamp, with the coupling means being so constructed and arranged that the driving and driven discs are not mechanically interconnected and may be shiftably adjusted with respect to each other to provide the desired braking pressure therebetween. The stopping of the braking clamp at predetermined rotational speed by speed responsive means causes the driven discs to stop and to bring the braking plate and rotary member to a stop by frictional drag action on the driving discs.

5 Claims, 6 Drawing Figures

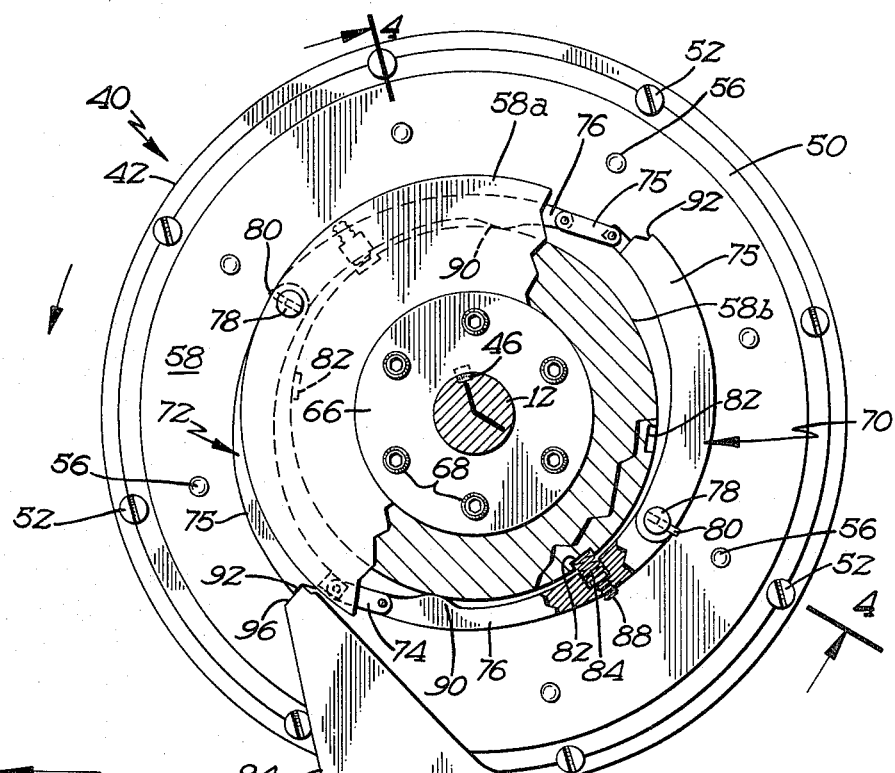
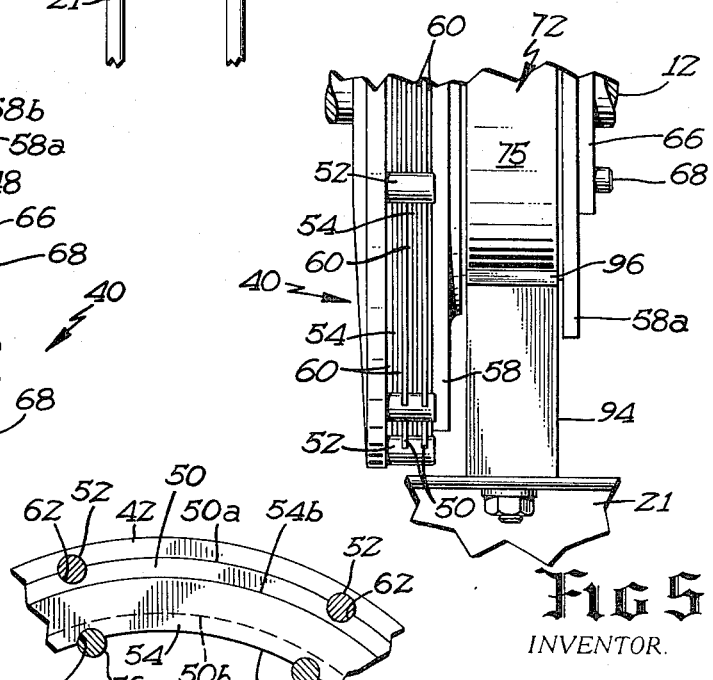
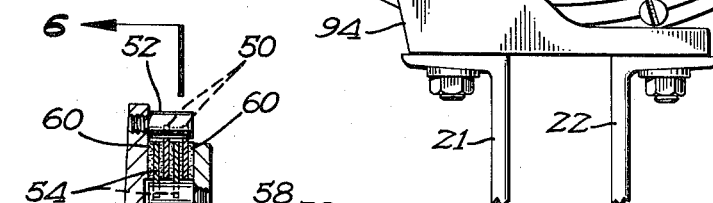
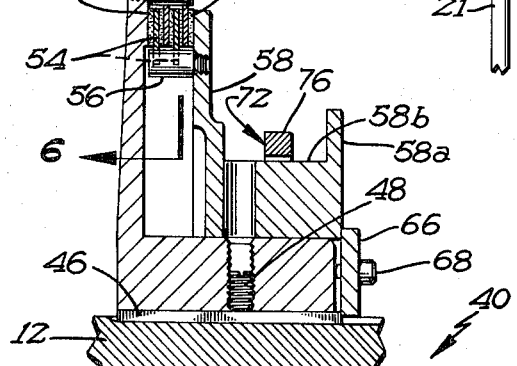
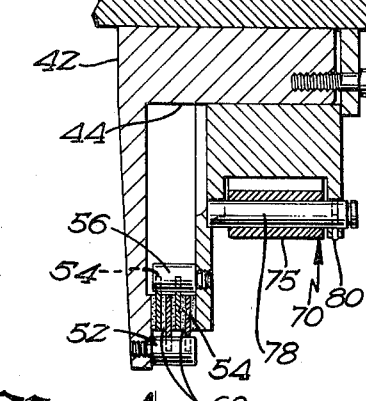

OVERSPEED SAFETY BRAKE FOR ELEVATORS

BACKGROUND OF THE INVENTION

A known problem associated with rotary mechanisms of various types is that of providing a braking device which will satisfactorily stop rotary movement to prevent runaway speeds in the event of overload or mechanical failure. This problem is troublesome on lifts, hoists and elevators of all types and particularly on so-called manlift elevators of the endless belt type where a vertically mounted or inclined endless belt having upwardly and downwardly moving belt sections or sides is provided with carrier attachments for lifting and lowering persons. Such endless belt elevators are used extensively in bakeries, breweries, processing plants of all kinds, factories, flour mills and wherever a fast method of moving workmen and service personnel up and down to different floors or work levels is required. There are holdback devices available which are adequate to prevent reversal of the elevator belt and travel of the load in a backwards direction. However, the need for a safety brake which is capable of stopping the elevator belt under a predetermined maximum load on the downside to prevent runaway downward movement of the belt in the normal direction of travel without damage to equipment or injury to passengers has not been met. There are elevator safety devices which utilize friction brakes, for example a brake drum and circular brake band or brake shoe arrangement, actuated by pawls or strike members attached to one of the cooperating brake members and movable under centrifugal force at a predetermined rotational speed to engage a stationary stop element. Such devices, however, have not proven satisfactory to meet the twofold requirements of providing enough braking force to stop an elevator under heavy, predetermined load conditions on the downside before dangerous elevator speeds in a downward direction are generated as the load accelerates under gravity and of not halting the elevator so abruptly as to damage the elevator drive mechanism or cause injury to persons riding on the elevator.

BRIEF SUMMARY OF THE INVENTION

Having in mind the foregoing problems associated with elevators, particularly those of the endless belt type, I have devised a safety brake which has an extraordinary amount of friction braking surface so as to be capable of stopping the elevator under especially heavy loads on the downside within a limited amount of travel so as to avoid the development of dangerous speeds under the influence of gravity, while providing a shock absorbing effect to prevent damage to the elevator drive mechanism or injury to passengers as a result of the sudden impact of a speed responsive strike member against a stationary stop element.

These basic objectives are realized by utilizing a brake assembly comprised of a plurality of annular driven and driving discs interleaved with each other to provide a large amount of friction braking surface and a concommittant shock absorbing effect caused by the frictional drag exerted by the multiple discs. The plurality of discs are clamped between annular end members for rotation with a portion of the elevator drive mechanism with the driving discs being coupled to one of the end members and the driven discs being coupled to the other end member in such a way that all of the discs are shiftably adjustable towards each other to achieve a desired frictional coaction therebetween to provide a braking force capable of handling a predetermined load on an elevator.

A particularly advantageous feature of my invention resides in coupling the aforesaid driving and driven discs to said annular end members by means of elongated connectors on which said discs are slidably shiftable to adjust the frictional coaction therebetween. Selective and independent coupling of the driving discs to one of the end members and of the driven discs to the other end member is achieved by extending the elongated connectors through radially offset peripheral portions of the discs, one of the sets of discs having at least portions of its outer periphery disposed radially outwardly beyond the outer periphery of the other plurality of discs, and said other plurality of discs having inner peripheral portions disposed radially inwardly from said one plurality of discs.

As a further beneficial aspect of my safety brake, a plurality of friction discs of annular shape are sandwiched between adjacent pairs of the aforesaid driving discs and driven discs and are held in place by frictional contact therewith. The driving and driven discs are coupled to the aforesaid annular end members by first and second sets of elongated coupling members extending generally parallel to the axis of rotation of the brake assembly, with said first and second sets of coupling members being radially offset with respect to each other; and the friction discs are adjusted and restrained radially in alignment with each other by contact of at least one peripheral edge thereof with one of said sets of elongated coupling members.

One of the aforesaid annular end members serves as a clamping means and is shiftable towards the other annular member by mechanical adjusting means preferably in the form of a clamping ring bearing against said one annular end member and secured to a hub portion of the other annular end member by threaded fasteners. The tightening of said threaded fasteners serves to shift said one annular member towards the other annular member. By this means, the driving and driven discs may be clamped more tightly together as desired to increase the frictional coaction therebetween and thus to increase the braking pressure derived therefrom. A strike element carried on the annular member which serves as a clamping device is operating in response to a predetermined rotational speed to move under the influence of centrifugal force to a stop position wherein it engages a stationary stop member and stops the annular clamp member. The driven discs coupled to the clamp member will also stop and will brake the elevator to a stop after predetermined movement thereof by frictional coaction with the driving discs.

BRIEF DESCRIPTION OF THE DRAWINGS

FIG. 3 is an end view of the safety brake taken along lines 3—3 of FIG. 2 and showing portions of the safety brake broken away;

FIG. 4 is a vertical section view of the safety brake taken along lines 4—4 of FIG. 3;

FIG. 5 is a fragmentary, side elevation view of the safety brake of FIG. 3; and

FIG. 6 is a fragmentary, section view taken along lines 6—6 of FIG. 4 and showing the coupling connection to the brake discs.

DESCRIPTION OF THE PREFERRED EMBODIMENT

Figure 1:
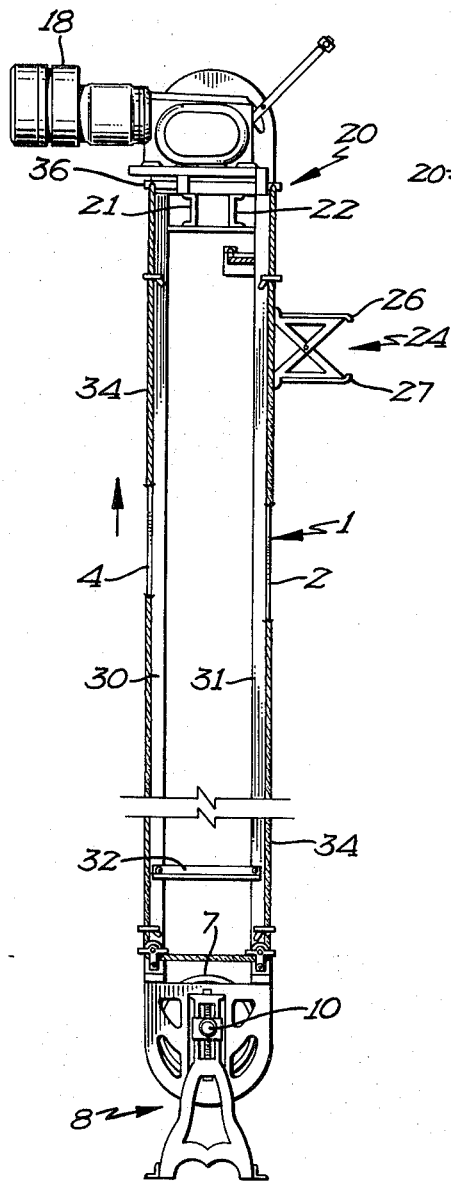
FIG. 1 is an elevation view of an endless belt, manlift elevator of the type on which the safety brake of this invention is particularly adapted to be used.
Figure 2:
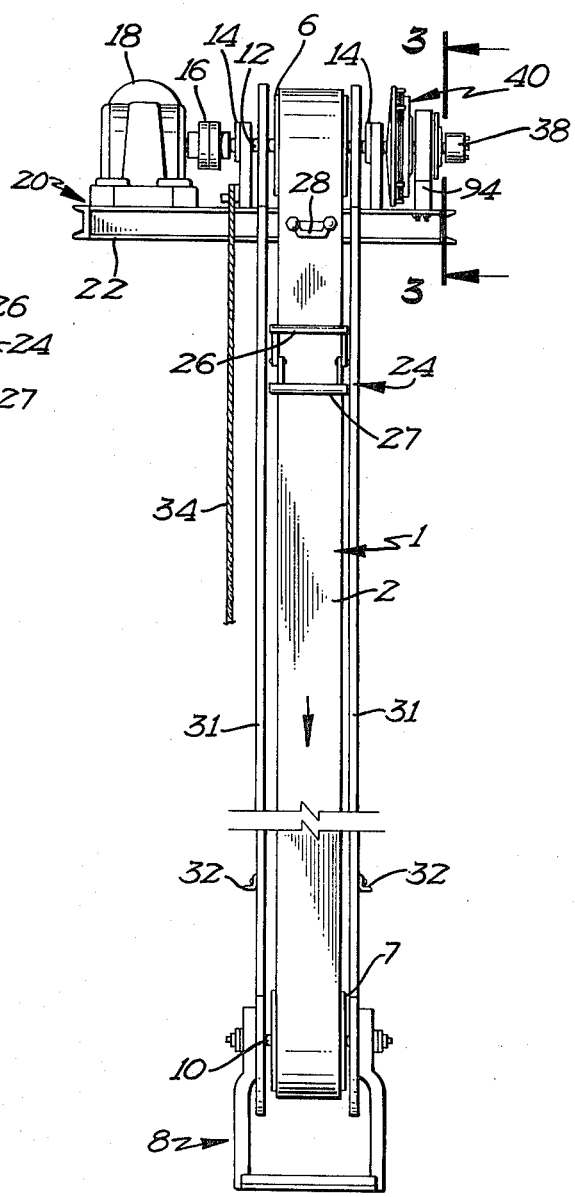
FIG. 2 is a side elevation view of the elevator of FIG. 1.

The safety brake of this invention has been particularly designed with a view towards preventing runaway travel of an elevator in the downward direction under load and the influence of gravity. I contemplate that my improved braking device may be used on various types of elevators employed for moving personnel or freight loads. In FIGS. 1 and 2 of the drawings, I have shown an endless belt type of manlift elevator on which the safety brake of this invention has found particular utility. The manlift elevator shown in FIGS. 1 and 2 is comprised of an endless belt generally indicated by reference numeral 1 and having downwardly and upwardly moving sides 2 and 4 respectively. Belt 1 is guided around an upper, head pulley 6 and a lower, base of foot pulley 7 rotatably supported on base assembly 8 by means of journaled shaft 10. Head pulley 6 is rotatably mounted on horizontally extending head shaft 12 journaled in a pair of pillow block bearings 14 and connected by means of a flexible coupling 16 to an electric drive unit 18. Drive unit 18 may take various forms, and has been shown as a right angle gear motor. The drive unit and support bearings 14 for head shaft 12 are mounted on a bed plate assembly comprised of a pair of parallel, laterally spaced channel iron beams 21 and 22.

A plurality of step assemblies are carried on endless belt 1 at spaced locations thereon, one of the step assemblies 24 being shown in FIGS. 1 and 2. Each of the step assemblies includes a pair of horizontally extending platforms 26 and 27 supported on cross braces, platforms 26 serving as a supporting step for a passenger when a particular step assembly 24 is moving upwardly, and platforms 27 assuming the top position and providing a supporting step when the step assembly 24 is traveling on the downside of the endless belt elevator. A plurality of hand grips 28 are also attached to endless belt 1 for use by passengers. A plurality of rollers, (not shown) attached to each step assembly 24 serves to guide the step assemblies in channel steel tracks 30,31 having cross braces 32 extending therebetween. A control rope 34 extends the full length of the manlift elevator on both the up and down sides and is connected at its upper ends to a control lever 36. Lever 36 is operatively associated with a switch (not shown) in the control circuit of the electric drive motor 18, thereby permitting a rider to stop or start the endless belt elevator at any point of travel by simply grasping rope 34 and pulling thereon.

One end of head shaft 12 has a hold back device 38 mounted thereon (FIG. 2), such devices being of well known design and operating to prevent rotation of head shaft 12 in a reverse direction so as to preclude reverse travel of endless belt 1 under load. Also mounted on the same end of head shaft 12 is the improved safety brake device 40 of this invention. Safety brake 40 serves to prevent runaway travel of endless belt 1 on downside 2 in the normal direction of travel of belt 1, which otherwise might be cuased by overload on downside 2 or by drive mechanism failure for any reason. Safety brake 40 is illustrated in detail in FIGS. 3 through 6.

Referring now to FIGS. 3, 4 and 5, it will be seen that safety brake assembly 40 is mounted on head shaft 12 as a convenient way of connecting the brake device to a rotary member of the elevator drive mechanism. Mounted on head shaft or drive shaft 12 for rotation therewith is a first annular member 42 in the form of a circular plate having an elongated hub portion 44 connected to head shaft 12 by key 46. A set screw 48 in hub 44 secures key 46 tightly against head shaft 12, thereby securely restraining annular plate 42 against lateral displacement along shaft 12. Coupled to annular plate 42 at a location adjacent the outer periphery thereof for reasons hereinafter explained, are a first plurality of driving brake discs 50 which lie in planes normal to the longitudinal axis of rotation of head shaft 12, and which are laterally spaced along said axis. Discs 50 are coupled to annular plate 42 for rotation therewith by means of a first set of elongated connectors 52 threadedly attached at their inner ends to plate 42. A second plurality of annular, driven braking discs 54 are interleaved with driving discs 50, both sets of discs 50 and 54 extending in parallel planes. Driven discs 54 are coupled by means of a second set of elongated connectors 56 to a second annular member 58 spaced apart from annular plate 42 along the longitudinal axis of head shaft 12. Annular member 58 serves as a clamping device in cooperation with annular plate 42 to tightly hold discs 50 and 54 therebetween in frictional association with each other. Although the frictional coaction between discs 50 and 54 could be accomplished by abutting these discs directly against each other, I prefer to accomplish this by utilizing a third set of friction discs 60 sandwiched between adjacent pairs of driving and driven discs 50 and 54 and held in place against lateral displacement by frictional contact therewith.

The selective and independent coupling of driving discs 50 to annular plate 42 and of driven discs 54 to braking clamp 58 is accomplished by providing radially offset portions of discs 50 and 54 at their inner and outer peripheries through which first and second sets of coupling members 52 and 56 extend. As may be noted most clearly by reference to FIGS. 4 and 6, this is preferably achieved by vertically or radially staggering plates 50 and 54. The outer periphery of driving discs 50 is disposed radially outwardly beyond the outer periphery of driven discs 54, and the first set of threaded connectors 52 extend through an outer peripheral portion of discs 50 at a location radially outwards from discs 54. The coupling engagement of threaded connectors 52 with discs 50 is achieved by providing a plurality of circumferentially spaced notch apertures 62 around the outer periphery of discs 50 through which elongated connectors 52 extend. This arrangement insures that discs 50 will be shiftably adjustable along coupling members 52 for a purpose hereinafter explained. Driven discs 54 are offset from outer discs 50 radially inwardly therefrom, thereby having inner peripheral portions disposed radially inwardly from discs 50 to receive the second set of coupling members 56. In FIG. 6 the inner and outer peripheral edges of discs 50 have been designated by reference numerals 50a and 50b, and the numerals 54a and 54b designate the inner and outer peripheral edges respectively of discs 54. A plurality of circumferentially spaced notches 64 in inner discs 54 receive the second, inwardly disposed set of coupling members 56, which are threadedly connected to braking clamp 58. Threaded connectors 56 are disposed radially inwardly from the inner periphery of driving discs 50 to avoid interference therewith. This particular coupling arrangement for the discs 50 and 54 permits the utilization of a plurality of discs for increased braking surface in a manner that provides for the selective coupling of the driving and driven discs to their respective annular members for independent rotation. Also, friction discs 60 are constrained and aligned radially by contact of their inner peripheral edges with inner coupling members 56; and outer coupling members 52 may be relied upon to limit the outward movement of discs 60.

The use of elongated coupling members in the form of threaded connectors 52 and 56 permits the sliding, lateral adjustment of discs 50 and 54 thereon so that the desired frictional pressure between the plurality of discs may be achieved. To this end, annular braking clamp 58 is slidably shiftable on hub 44 and is provided with mechanical adjusting means for shifting it towards braking plate 42 in direction parallel to the axis of rotation of head shaft 12. The mechanical adjusting means preferably comprises a clamping ring 66 which bears against the outer end surface 58a of annular clamping member 58. Clamping ring 66 is attached to hub portion 44 of annular plate 42 by a plurality of circumferentially spaced cap screws 68. Thus, the tightening of cap screws 68 will serve to shift clamping ring 66 and annular clamping member 58 towards annular plate 42 with the result that braking discs 50, 54 and 60 will be more tightly clamped together to increase the frictional coaction therebetween. In this way, the braking force applied by safety brake 40 can be increased or adjusted as required for a particular load on the downside of endless elevator belt 1.

Braking action is accomplished by stopping braking clamp 58 and driven discs 54 coupled thereto in response to a predetermined rotational speed of head shaft 12 indicative of overload conditions or runaway movement of endless belt 1 in a downward direction. For this purpose, a pair of pawls or strike elements 70,72 are pivotally attached to braking clamp 58 for rotation therewith. Pawls 70 and 72 are of arcuate shape as shown in FIG. 3, and extend around a cylindrical segment 58b of brake clamp 58, pawls 70 and 72 being connected together at their opposite ends by links 74 so that they will move together. Pawls 70 and 72 are each comprised of an arm section 75 of enlarged width, and a relatively narrow arm portion 76. A pair of pivot pins 78 extending through outer annular collar 58a of brake clamp 58 and into an inner wall portion thereof serve to hold pawls 70 and 72 in place. Pivot pins 78 are secured in position by means of lock pins 80 inserted through annular collar 58a of brake clamp 58 in a radial direction and extending into an aligned, through hole in pins 78. Seated in recesses 82 in the outer periphery of cylindrical portion 58b of brake clamp 58 are a pair of opposed coil springs 84 which engage narrow arm sections 76 of pawls 70 and 72 through aligned recesses therein and act to normally urge ends 76 of pawls 70 and 72 outwardly about pivot pins 78. In this normal position of use, enlarged outer end portions or arms 75 of pawls 70 and 72 will be pivoted inwardly against the peripheral surface of cylindrical section 58b. It is to be noted that four spring recesses or seats 82 are provided in the peripheral surface of cylindrical section 58b of brake clamp 58. The reason for this is to permit the reverse mounting of pawls 70 and 72 from that shown, with enlarged arm sections 75 extending in the opposite direction, whereby the safety brake 40 may be adapted for proper operation with head shaft 12 rotating in the opposite direction from that indicated by the directional arrow in FIG. 3.

Coil springs 84 are placed in compression by set screws 88 which extend through pawl arm sections 76 in threaded engagement therewith. Set screws 88 are adjusted as desired so that at a predetermined rotational speed of shaft 12, heavier ends 75 of pawls 70 and 72 will be urged outwardly by centrifugal force against the restraining pressure of springs 84. When this occurs, arm sections 76 of the pawls will swing inwardly until stop cams 90 thereon engage the periphery of cylindrical portion 58b of brake clamp 58, cams 90 serving to limit the outward movement of pawl arm sections 75. In FIG. 3, pawls 70 and 72 are shown in the outwardly pivoted positions of arm section 75 which they will assume when the predetermined rotational speed of shaft 12 has been reached.

The outer end of enlarged arm sections 75 of each of the pawls 70 and 72 is provided with a shoulder 92 shaped and located to strike the upper end of a stationary stop plate 94 when pawls 70 and 72 are urged outwardly to their maximum extent under the effect of centrifugal force at the predetermined, maximum rotational speed of shaft 12. Stop plate 94 is bolted to channel iron beams 21 and 22 of the bed plate assembly for the electric drive unit 18. An angled surface 96 at the upper end of stop plate 94 serves as a contact surface for shoulder 92 of pawls 70 and 72.

In operation, the entire safety brake assembly 40 will rotate as a unit with head shaft 12. If an overload condition on the downside 2 of the endless belt 1 should cause shaft 12 to rotate at a speed in excess of a predetermined safe speed, the braking device will be actuated by the effect of centrifugal force on pawls 70 and 72. For example, if belt 1 is set to run at a normal speed of 80 feet per minute, then the pawls will be set to swing outwardly against the pressure of springs 82 at a rotational speed of 86 feet per minute by adjusting set screws 88. When the maximum, predetermined rotational speed is exceeded, heavy ends 75 of pawls 70 and 72 will swing outwardly to the positions shown in FIG. 3, and shoulder 92 on one or the other of the pawls will rotate into engagement with contact surface 96 of stop plate 94. The use of two pawls in the arrangement shown insures that drive shaft 12 will not rotate through more than one half a revolution before one of the pawls engages stop plate 94. The two pawls 70 and 72 act as counterweights for each other, and interconnecting links 74 insure that as one pawl pivots outwardly under the effect of centrifugal force and strikes stop plate 94, the other pawl will also move outwardly with it. A safety switch, not shown, is positioned and arranged to be contacted by one of the outwardly urged pawls to stop electric drive motor 18 to prevent damaging the motor under overload conditions. The engagement of one of the pawl arm sections 75 with stop plate 94 will immediately stop brake clamp 58 to which the pawls are attached, and driven brake discs 54 coupled thereto. The friction pressure between brake discs 50, 54 and 60 is adjusted by means of cap screws 68 so that when discs 54 stop with brake clamp 58, there will be some slippage between the braking discs, and discs 50 will continue to rotate with plate 42 and head shaft 12 through a limited amount of rotational travel. The frictional drag of discs 54 and friction discs 60 on rotating discs 50 will brake discs 50, annular plate 42 and drive shaft 12 to a stop under predetermined overload conditions on the downside of belt 1 before potentially harmful and injurious runaway speeds of belt 1 can be developed.

It will be appreciated that if belt 1 is allowed to move freely on its downside 4 under overload conditions thereon, belt 1 would pick up enough speed to cause severe damage to the drive mechanism or other portions of the manlift elevator when the belt is stopped. The objective is to stop endless belt 1 within a relatively short travel distance when overload conditions are encountered with a minimum of shock to the drive mechanism so as to avoid mechanical damage. This is accomplished by my safety brake 40 by virtue of the particular arrangement of multiple braking discs assembled as described herein. Substantially all of the impact shock resulting from the contact of one of the pawls 70 or 72 with stop plate 94 is absorbed by the plurality of braking discs in frictional coaction with each other. The multiplicity of brake discs and friction discs 50, 54 and 60 in the arrangement shown provides positive stopping action of head shaft 12. Enough braking force is exerted to stop downwardly moving belt 1 under overload conditions by virtue of the large amount of braking surface provided, without stopping the drive mechanism so abruptly as to break or severely damage any portion thereof, such as the coupling connection 16 between drive unit 18 and head shaft 12. Not only do I achieve a maximum amount of braking force by utilization of a plurality of braking discs, but by locating the discs 50, 54 and 60 radially outwardly from head shaft 12, the frictional braking action between the discs is applied at a relatively large radial distance from the axis of rotation of shaft 12 to thereby exert a maximum amount of braking torque. The vertically or radially staggered arrangement of discs 50 and 54 permits the use of a plurality of braking discs for greater braking surface while providing for the selective coupling of the driving and driven discs to separate annular members 42 and 58 utilizing elongated connectors 52 and 56 for coupling members.

While I have shown and described my improved safety brake as applied to a manlift elevator, I anticipate that my speed actuated brake will find utility in combination with rotary components of any mechanism and machines where excessive, runaway, speeds must be prevented. For example, my safety brake would appear to be particularly well suited for use on cable cars, ski lifts, cranes and hoisting machinery of all kinds.

I claim:

1. In combination with the rotary head shaft of an elevator, a safety braking device comprising:
    an annular braking plate secured to said rotary shaft for rotation therewith;
    a plurality of annular, driving discs coupled to said braking plate for rotation therewith, said driving discs lying in planes normal to the axis of rotation of said rotary shaft and being spaced along said axis;
    a plurality of driven, annular braking discs extending parallel to said driving discs and spaced along said axis of rotation, said driving discs and driven discs being interleaved in frictional association with each other;
    annular braking clamp means spaced along said axis of rotation from said braking plate and cooperating therewith to clamp said driving and driven discs therebetween, said driven discs being coupled to said clamp means for rotation therewith, so as to provide a unitary braking assembly comprised of said braking plate, said driving and driven discs, and said clamp means all of which components normally rotate together with said shaft;
    a stationary stop member positioned adjacent the periphery of said braking clamp means; and
    at least one pawl element pivotally secured to said braking clamp means for rotation therewith and pivotal radially outwardly therefrom under the effect of centrifugal force at a predetermined rotational speed of said rotary shaft into engagement with said stop member, whereby said driven discs will stop with said clamp means and will brake said braking plate and rotary shaft to a stop within limited rotational movement of said braking plate by frictional association with said driving discs.

2. Safety braking apparatus as defined in claim 1 wherein:
    said driving and driven discs are coupled to said braking plate and to said braking clamp means respectively by elongated coupling members on which said discs are shiftable in a direction parallel to said axis of rotation;
    said annular braking plate has a cylindrical hub portion formed integrally therewith, said rotary shaft extending through said hub portion and being secured thereto;
    said annular braking clamp means including a cylindrical segment embracing said hub portion and slidable thereon for adjustment in a direction parallel to said axis of rotation; and
    further including mechanical adjusting means in the form of a clamping ring bearing against one end of said cylindrical segment and secured to said hub portion by threaded fasteners, the tightening of said threaded fasteners serving to shift said annular braking clamp means towards said braking plate, whereby said driving and driven discs may be clamped more tightly together as desired to increase the frictional coaction therebetween and thus to increase the braking pressure exerted by said driven discs on said driving discs when said braking clamp means is stopped by said stop member.

3. Safety braking apparatus as defined in claim 2 wherein:

said pawl element is of arcuate shape and extends around the outer periphery of said cylindrical segment of said annular braking clamp means in substantial comformity to the curvature thereof, and said pawl element being pivotally mounted on a pivot pin located radially outwardly from said cylindrical segment and extending parallel to said rotary shaft between an outer flange ring surface of said annular braking clamp means and the annular surface of said braking clamp means to which said driven discs are coupled.

4. Safety braking apparatus as defined in claim 2 wherein:

said coupling members are elongated connectors securely attached at one end to said braking plate and braking clamp means respectively and extending through apertures in said discs in a direction parallel to said rotary shaft, said driving and driven discs having outer and inner peripheral portions radially offset with respect to each other, and said elongated connectors for one of said plurality of discs being located radially outwardly beyond the outer periphery of the other plurality of discs and the elongated connectors for said other plurality of discs being located radially inwardly from the inner periphery of said one plurality of discs.

5. Safety braking apparatus as defined in claim 1, and further including:

a plurality of friction discs of annular shape sandwiched between adjacent pairs of said driving discs and driven discs and held in place by frictional contact therewith; and wherein said driving and driven discs are coupled to said braking plate and braking clamp means respectively by first and second sets of elongated coupling members extending generally parallel to said axis of rotation at radially spaced locations with respect thereto, said friction discs being adjusted and restrained radially in alignment with each other by contact of at least one peripheral edge thereof with one of said sets of coupling members.

* * * * *